Aug. 26, 1924.
J. R. OISHEI
1,506,132
WINDSHIELD WIPER
Filed Aug. 9, 1923  2 Sheets-Sheet 1
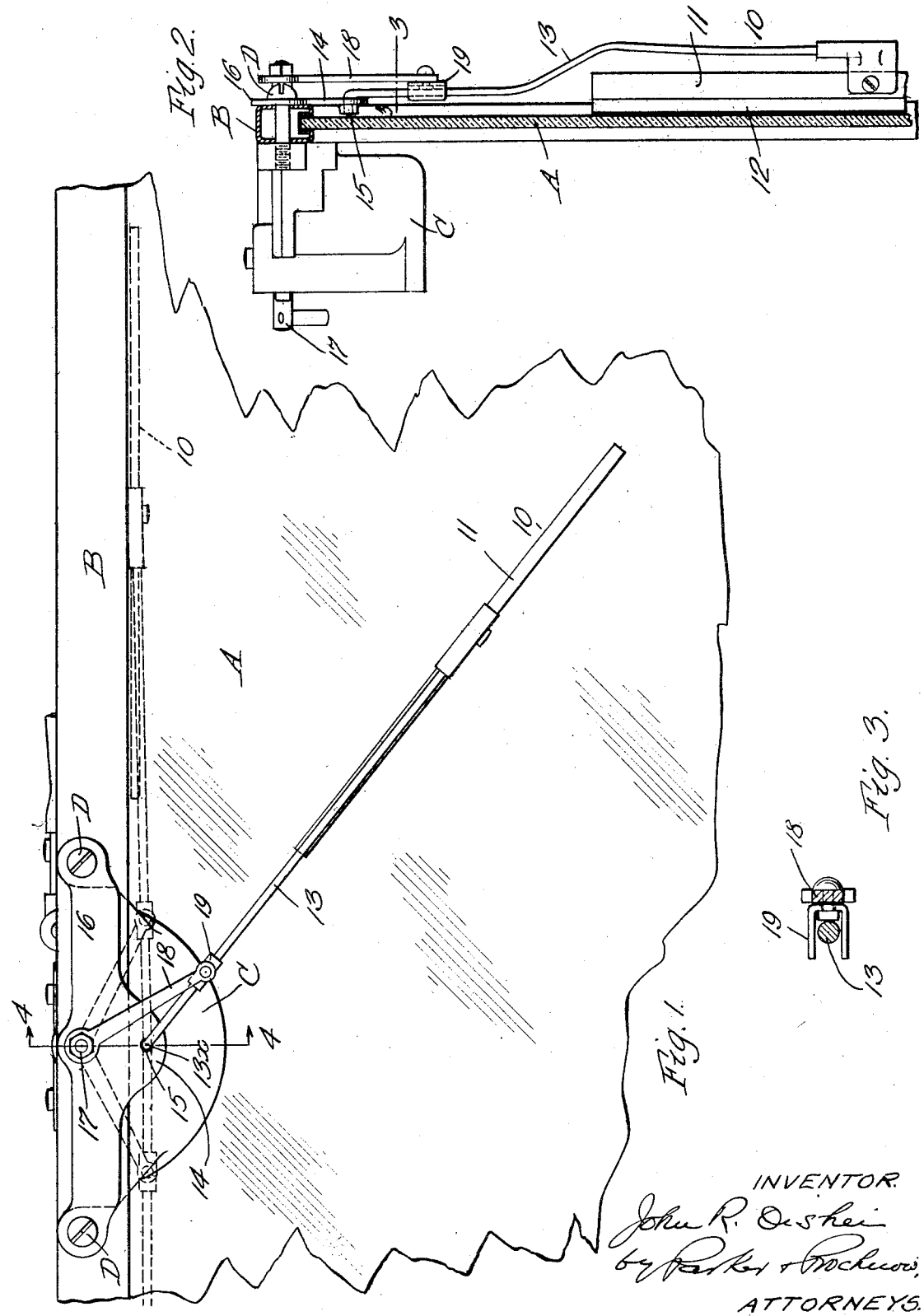
INVENTOR.
John R. Oishei
by Parker & Mockvois
ATTORNEYS.

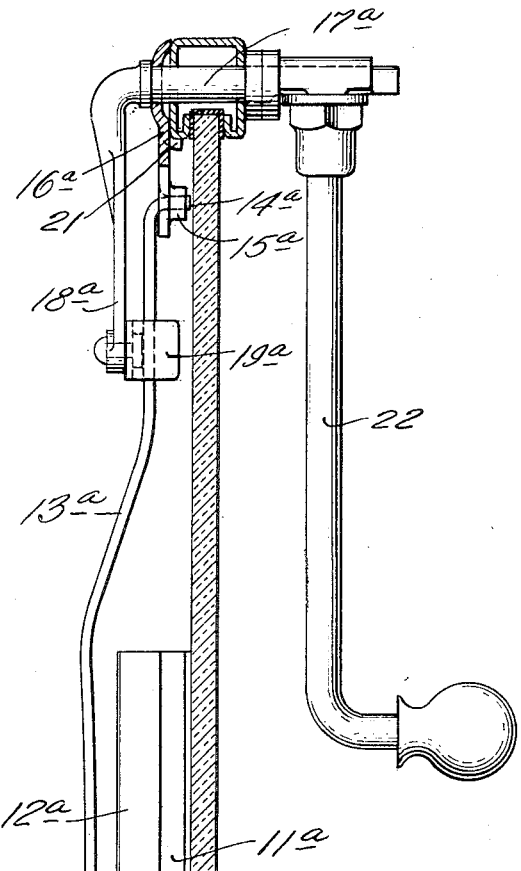
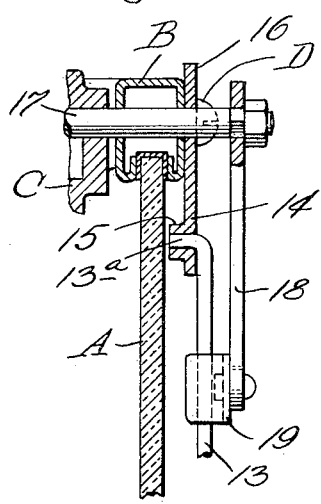
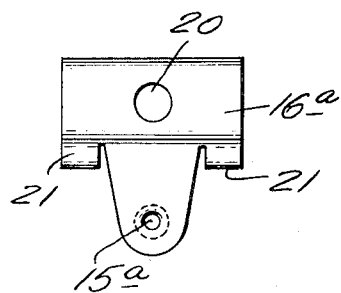

Patented Aug. 26, 1924.

1,506,132

UNITED STATES PATENT OFFICE.

JOHN R. OISHEI, OF BUFFALO, NEW YORK.

WINDSHIELD WIPER.

Application filed August 9, 1923. Serial No. 656,530.

*To all whom it may concern:*

Be it known that I, JOHN R. OISHEI, a citizen of the United States, residing at Buffalo, in the county of Erie and State of New York, have invented a new and useful Improvement in Windshield Wipers, of which the following is a specification.

This invention relates to windshield wipers of the type adapted to be moved on the outer face of the windshield glass and to clean the glass, and consisting, generally, of a wiper strip of rubber or other suitable material which contacts with the face of the glass, means for resiliently urging the wiper into contact with the glass, a shaft or member extending from the inner side of the windshield to the exterior thereof, and means between the shaft or member and the wiper whereby the wiper is moved on the windshield glass when the shaft is actuated.

Heretofore, the spring lever or other means for resiliently urging the wiper strip into contact with the face of the glass has been fulcrumed on the shaft or on the bearing for the shaft. In hand actuated cleaners, the shaft or member is usually provided with a handle at the inner side of the windshield and there is usually more or less looseness or "play" between the shaft and bearing. Further, the pressure of the spring arm exerts a thrust upon the shaft which tends to cause the shaft to get out of alinement in its bearing and the friction attendant upon movement of the shaft in the bearings is greatly increased. In the case of power actuated cleaners which have rock shafts extending to the outer side of the windshield, a similar situation prevails. In the case of suction or pressure operated cleaners, the thrust on the shaft from the action of the spring arm may result in an undesirable end thrust upon the piston shaft. Uniform engagement of the wiper strip with the glass and uniform pressure on the glass is more readily obtained by providing a fixed fulcrum for the resilient arm.

The objects of the present invention are to provide a windshield wiper in which the wiper strip while in operation is at all times held in engagement with the windshield glass under uniform pressure; also to provide a windshield wiper in which friction and thrusts upon the shaft bearings or shaft are reduced to the minimum; also to provide a windshield wiper which efficiently operates on a minimum of effort; also to provide a windshield wiper in which movement of the rock shaft through a given angle produces a greater movement of the wiper strip without undue pressure or friction; and also to provide improvements in windshield wipers in the other respects hereinafter described and claimed.

In the accompanying drawings:

Fig. 1 is an elevation of a device embodying the present invention, mounted on a portion of a windshield.

Fig. 2 is a side elevation thereof, the windshield being in section.

Fig. 3 is a section on line 3—3, Fig. 2.

Fig. 4 is a section thereof on line 4—4, Fig. 1.

Fig. 5 is a sectional elevation of a hand actuated windshield cleaner embodying the invention.

Fig. 6 is an elevation of a portion of the device shown in Fig. 5.

Referring to Figs. 1 to 4, according to the invention a wiper 10 is provided which may comprise the usual rubber holder or channel 11 which carries a stip or strips of rubber 12 or other suitable material, which is adapted to contact with and be moved on the face of a windshield glass A to clean the same, and an arm or member 13 for guiding the wiper strip in its movements across the glass. B designates a usual frame bar of the windshield. The wiper may be moved over the face of the windshield glass by means of a suitable member extending through or over the frame bar of the windshield or between the glass sections thereof.

It is necessary in order to effect proper cleaning of the glass that the wiper strip bear with considerable and uniform pressure upon the glass. In order to prevent excessive pressure on the windshield parts or upon the operating member for moving the wiper, which excessive pressure results in the operating member jamming or seizing in its bearing, making it difficult to move, or wearing the relatively soft metal of the frame bar, the present invention provides means for taking these pressures upon a relatively hard bearing independent of the operating member.

In the embodiment of the invention shown, the arm 13 which exerts the required pressure on the wiper strip, engages the wiper and bears on the windshield independently of the operating member, being preferably fulcrumed on a part 14 which is independent of the operating member. For this purpose, as shown, the spring arm 13 may be provided with a bearing portion 13ˣ which seats in a relatively hard bushing or tubular bearing 15. The bushing 15 and the bearing portion 13ˣ of the spring arm are of such size and shape that when the bearing portion 13ˣ of the arm is in the bushing the wiper strip 10 is held in engagement with the face of the windshield glass under the required pressure. The bushing 15 or the like may be formed integrally with or form a separate attachable piece for, a suitable plate or member 16 which is attached to a portion of the windshield.

The wiper may be actuated by suitable means, for example in Figs. 1 to 4 the cleaner, generally, is of the automatic-fluid-pressure-operated type. In these figures C designates a fluid pressure motor part of the cleaner having a rock shaft 17 operated thereby and extending through the windshield frame bar. The cleaner is held in place on the windshield frame bar by suitable means, such as machine screws D or the like which, as illustrated, may be used also to hold the member 16 on the frame bar.

The rock shaft 17 is provided with a suitable part or member engaging the wiper for oscillating the wiper when the shaft is rocked. For this purpose, in the embodiment shown, the rock shaft is provided with an arm or lever 18 having a fork 19 or the like engaging the spring arm. As illustrated, the fork 19 is preferably swivelled or pivoted to the lever 18 so that it may turn as the cleaner oscillates, thereby lessening friction between the fork and the spring arm.

In the device shown in Figs. 5 and 6 of the drawings, 10ª designates the wiper consisting of the rubber or like strip 11ª, rubber holder 12ª, spring arm 13ª and a plate member 16ª having a relatively hard bushing or bearing part 15ª for receiving a portion 14ª of the arm 13ª. In order to securely hold the bearing plate in position, it may be provided as shown, with an aperture 20 through which the shaft 17ª projects and with lugs or tongues 21 which engage the underside of the windshield frame bar. 18ª designates a lever or arm on the shaft 17ª which may be provided with a pivoted fork portion 19ª for engaging the spring arm. 22 designates a usual handle whereby the cleaner may be operated.

In the devices of the invention, as hereinabove described, the spring or pressure arm is fulcrumed on a part other than the actuating shaft of the cleaner and therefore, any desired even or uniform pressure may be maintained on the wiper strip. There is no pressure on the rock shaft when the device is not in operation and when in use the only pressure is that caused by the resistance of the wiper to movement and is angularly of the shaft. The invention makes it possible to make the bearings which take the pressure of small portions of hardened metal, materially lengthening the life of the device and preventing damage to the windshield. At the same time, the leverage obtained by fulcruming the wiper below the shaft, results in movement of the wiper through a greater angle than that traversed by the handle or operating part. This makes it possible to clean the glass through an angle of 180° with an operating member whose movement is limited to a lesser angle, and, as shown in Fig. 1, permits the wiper strip in its upper positions, to repose substantially flush and parallel with the upper frame bar of the windshield, where it is out of the way.

I claim as my invention:

1. In a windshield wiper, a wiper strip, a rock shaft for actuating said wiper strip, a spring arm engaging said wiper strip and pressing said wiper strip toward the windshield glass, said spring arm having a bearing portion journalled independently of and spaced from said shaft, and a part on said shaft engaging said spring arm between said bearing portion and its wiper strip engaging portion for oscillating said wiper strip when said shaft is rocked.

2. In a windshield wiper, a wiper member for engaging a face of a windshield glass to clean the same, a rock shaft, means for actuating said rock shaft, a spring arm pivoted adjacent one end to said wiper member, a bearing for the other end of said spring arm independent of said rock shaft whereby said spring arm yieldably retains said wiper in contact with the windshield glass, and a part on said rock shaft engaging said spring arm, whereby said spring arm and wiper member are oscillated when said shaft is rocked.

3. A windshield wiper comprising a wiper strip and a supporting member therefor having a resilient portion for pressing said wiper strip into resilient engagement with a windshield glass, a rock shaft, means on said rock shaft engaging said supporting member whereby said wiper is oscillated when said shaft is actuated, and a bearing for said supporting member independent of and spaced from the axis of said rock shaft, whereby said supporting member yieldably retains said wiper strip in contact with the windshield glass independently of said rock shaft.

4. A windshield wiper comprising a wiper member and a spring arm for supporting said wiper and pressing it against a windshield glass, a bushing member adapted to be supported in fixed position on a part of the windshield frame, said spring arm having a projecting part journaled in said bushing member whereby the pressure exerted by said spring arm is taken at one end on the fixed bushing member and the wiper member is yieldingly retained in contact with the windshield glass, and a rock shaft pivotally mounted independently of and at a different location from said bushing, and a part on said rock shaft establishing connections between said rock shaft and said spring arm to move the wiper member when the shaft is rocked.

5. In a windshield wiper, a wiper strip, a spring arm engaging said wiper strip for resiliently pressing said wiper strip against the face of a windshield glass, an actuating member extending from adjacent said face of the windshield glass to the other face of the windshield glass, whereby said actuating member may be operated from within the vehicle, an angular projection on an end of said spring arm, and a bearing for said angular projection spaced from the axis of said actuating member and shaped to receive said projection for causing said spring arm to resiliently press said wiper strip against the glass, and a part on said actuating member engaging said spring arm for moving said wiper strip on the glass when said actuating member is operated.

JOHN R. OISHEI.